Feb. 6, 1940.   R. S. BUCK ET AL   2,189,162
DRAIN VALVE
Filed Sept. 23, 1937   2 Sheets-Sheet 1

INVENTOR.
Richard S. Buck.
Harry W. Gunberg
BY Harris G. Luther
ATTORNEY

Feb. 6, 1940.  R. S. BUCK ET AL  2,189,162
DRAIN VALVE
Filed Sept. 23, 1937  2 Sheets-Sheet 2

INVENTOR.
Richard S. Buck
Harry W. Gunberg
BY Harris G. Luther
ATTORNEY

Patented Feb. 6, 1940

2,189,162

UNITED STATES PATENT OFFICE 2,189,162

DRAIN VALVE

Richard S. Buck, Wethersfield, and Harry W. Gunberg, West Hartford, Conn., assignors to United Aircraft Corporation, East Hartford, Conn., a corporation of Delaware Application September 23, 1937, Serial No. 165,234

12 Claims. (Cl. 123—119)

This invention relates to improvements in engine induction system and has particular reference to improvements in the fuel induction system of internal combustion engines.

An object of the invention resides in the provision of improved means for draining liquid fuel condensate or other liquids from the fuel induction system of the engine.

An additional object resides in the provision of a liquid drain means for an engine induction system so arranged that, while fully effective to drain all liquids from the engine induction system, it will not involve a leakage of air or fuel mixture either into or out of the system during operation of the engine.

Other objects and advantages will be more particularly pointed out hereinafter or will become apparent as the description proceeds.

In the accompanying drawings in which like reference numerals are used to designate similar parts throughout, there are illustrated two slightly modified arrangements of what is now considered to be the preferred form of the invention. The drawings, however, are for the purpose of illustration only and are not to be taken as limiting the invention, the scope of which is to be measured by the scope of the appended claims.

In the drawings, Fig. 1 is a vertical sectional view through the induction system of an internal combustion engine showing the application thereto of an improved liquid drain device incorporating this invention.

Figure 1:
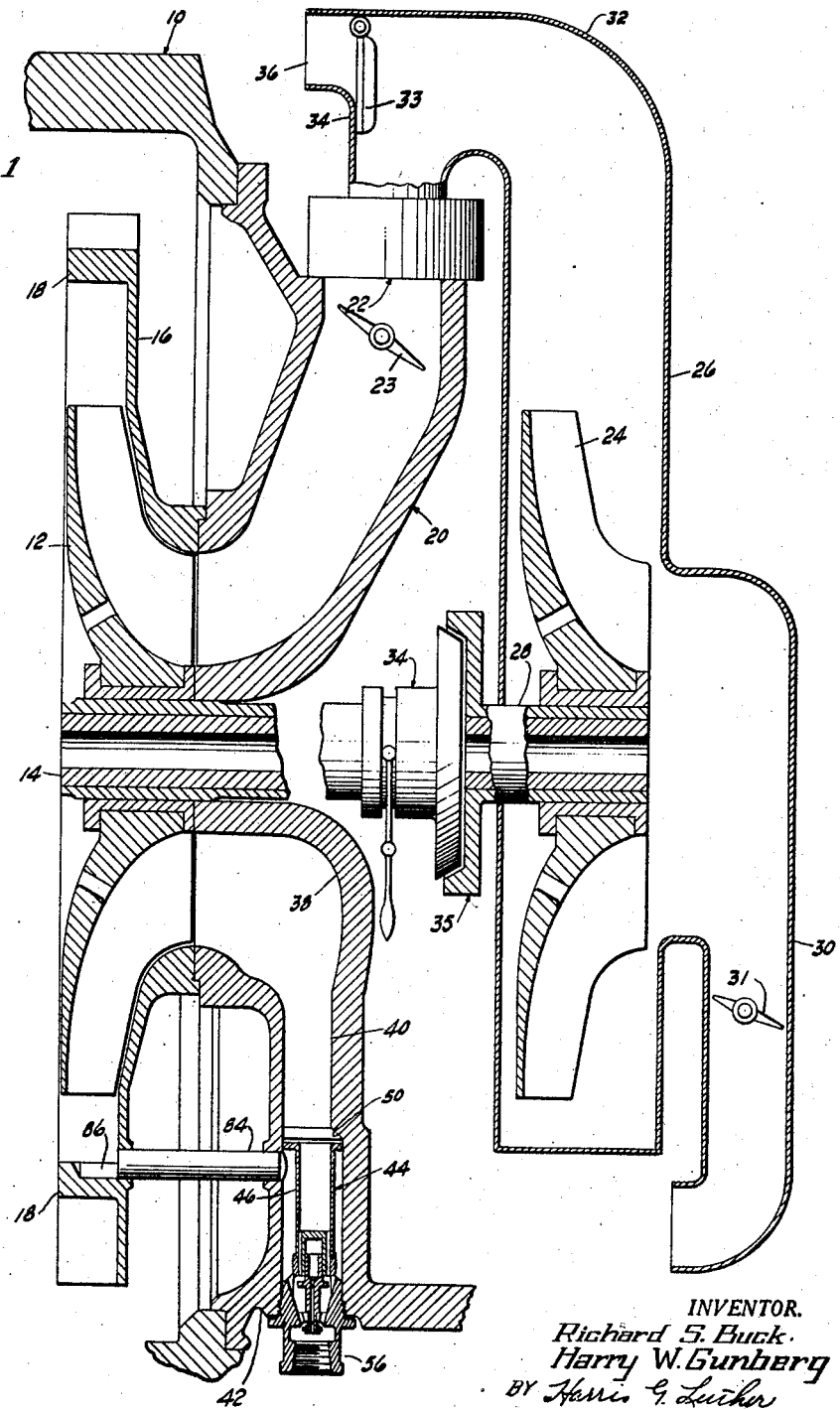

Referring to the drawings in detail the numeral 10 generally indicates a fragmentary portion of an internal combustion engine, the portion illustrated by way of example, being a portion of the rear section or blower section of a supercharged engine. The supercharger impeller 12 is mounted upon a shaft 14, driven by the engine, and is rotated in a casing 16, provided with an annular portion surrounding the periphery of the impeller 12, in which annular portion there are diffusing vanes 18.

Air or fuel mixture is led to the supercharger through a conduit such as is generally indicated at 20. Such a conduit usually comprises a tubular element which may be formed integrally with the rear closure member of the blower section 10, connected at one end with an air duct or carburetor, as indicated at 22, and terminating at the other end in an annular chamber surrounding the hub portion of the impeller 12. The flow of air or fuel mixture through this conduit may be controlled by a suitable throttle valve as indicated at 23.

In some installations, such as in connection with aircraft engines adapted to operate at high altitudes, an additional supercharger, including the impeller 24, disposed in the casing 26 and carried by the shaft 28, may be utilized to supply additional air to the engine. Such an additional supercharger may have its inlet connected with an air duct, as indicated at 30, and may have its outlet 32 connected with the intake of the carburetor 22, as indicated at 34. In such an installation suitable valves, as indicated at 31 and 33, and other control elements are provided to coordinate the operation of the two superchargers to the various altitudes at which the engine may be operated. If desired, the auxiliary supercharger stage may be clutch-driven from the engine so that it may be disconnected from the engine and rendered inoperative when desired. Such a clutch connection is schematicaly illustrated by the structure generally indicated at 35. In such a case the carburetor 22 may be provided with an additional air inlet, as indicated at 36, leading directly from the atmosphere and controlled by the valve 33, so that the engine may receive its necessary air for fuel combustion directly from the atmosphere when the auxiliary supercharger stage is not operating.

While the carburetor 22 has been shown as inserted between the two supercharger stages, it is to be understood that the carburetor may be located at any desired position and may be either an injection or induction type carburetor or any other form suitable for supplying fuel to an internal combustion engine. It is also to be understood that the device of the invention may be advantageously applied to fuel injection type engines or to any engine in which liquids, either from the condensation of fuel or from the condensation of moisture in the air supplied to the engine, has a tendency to collect in the engine air or fuel mixture induction system.

In the arrangement illustrated the annular chamber 38 surrounding the hub portion of the impeller 12 is provided at its lower or bottom side with a drain channel 40, leading to the exterior of the blower section closure member at the bottom thereof, as indicated at 42, so that any liquid accumulating in the annular chamber 38 will drain downwardly through the channel 40.

Figure 2:
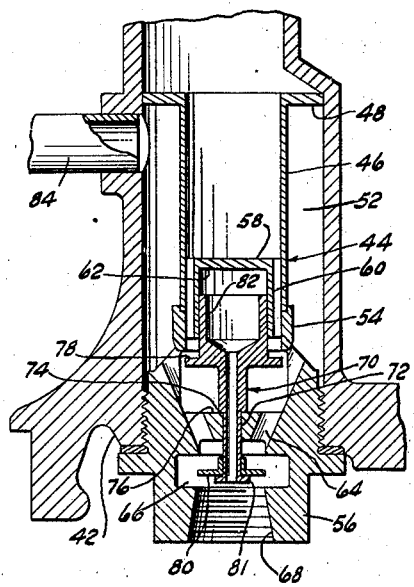
Fig. 2 is a vertical sectional view on an enlarged scale of the liquid drain valve illustrated in Fig. 1.

Within the lower end of the drain channel 40 there is inserted an improved liquid drain mechanism, shown in two slightly different forms in the accompanying drawings. The drain mechanism shown in Figs. 1 and 2 is generally indicated at 44 and includes a tubular element 46 having an outside diameter somewhat less than the diameter of the bore of the lower portion of the drain channel 40 and provided at its upper end with a flange 48 which contacts the surface of the bore of the drain channel at a position adjacent to the inwardly flared tapered shoulder 50 in the channel and provides an annular space 52 between the tubular member 46 and the interior of the portion of the drain channel which includes the tube. At its lower end the tubular member 46 rests upon the upper edge of an annular boss 54 carried on a tubular nut 56, screw-threaded into the lower end of the drain channel 40. In its lower end the tubular member 46 is provided with an integral plug 58 pierced by the apertures 60 and bored to provide a guideway 62. Below the annular boss 54 the nut 56 is provided with passageways or apertures 64, which lead from the annular space 52 between the tubular member 46 and the wall of the drain passage to an annular chamber 66 provided in the lower portion of the nut 56 and connected with the screw-threaded aperture 68 which receives the upper end of a drain tube, not illustrated.

A movable valve element, generally indicated at 70, has a stem portion 72 provided intermediate its length with a shoulder 74 adapted to rest, when the valve member is in its lowermost position, as illustrated, upon the upper surface of an abutment 76 provided by an integral portion of the nut 56 between the lower ends of the apertures 64. Above the shoulder 74 the valve element is provided with a flange portion 78 which has a sliding fit in the boss 54 and consitutes a valve disk for controlling the apertures 60. Upon its lower end the stem 74 carries a valve disk 80 for controlling the apertures 64. This valve disk is slidable on the stem in order that it may move independently of the stem under the influence of an inwardly directed air current, to seal the apertures 64, and is supported by an abutment 81. The stem is made hollow to connect the space between the piston 82 and the guideway 62 with the atmosphere.

The annular space 52 is connected by means of a tubular channel 84 with the interior of the annular chamber surrounding the periphery of the impeller 12. One end of the channel 84 leads into the interior of the casing 16 and terminates near one end of a depression 86, provided in the upper surface of the lower one of the vanes 18, so that any liquid collecting on the vane will flow into the depression 86 and from thence through the tubular channel 84 into the annular space 52 surrounding the tubular member 46.

During engine operations the pressure in the outlet chamber of the primary supercharger, connected with the channel 84, will be greater than the fluid pressure in the intake chamber 38, connected with the drain channel 40. This pressure difference between the inlet and outlet of the supercharger tends to produce an energy wasting recirculation through the drain channels and impeller. The pressure in the supercharger outlet may be either above or below the pressure of the surrounding atmosphere depending on various operating conditions. A higher pressure outside tends to cause a fuel mixture weakening airflow into the induction system, and a lower pressure outside tends to cause a leakage flow of fuel mixture or air from the induction system. The simple valve mechanism illustrated and described above, utilizing the air flow tendencies mentioned, effectively inhibits fluid flow through the drain channels during engine operation and opens the channels to permit drainage as soon as operation ceases.

Two operating conditions will be considered, one, when the fluid pressure at the supercharger outlet is at or above atmospheric, for instance, when the engine is operating unthrottled, or is operating at altitude utilizing the auxiliary supercharger stage, and, two, when the fluid pressure at the supercharger outlet is below that of the surrounding atmospheric, for example, when the engine is partially throttled.

Under the first condition the higher pressure within the induction system acting on the upper face of disk 80 and atmospheric pressure acting on the lower face will produce an unbalanced force on the valve disk 80 tending to open the valve. Atmospheric pressure acting on piston 82, which has an area substantially the same as that of the disk 80, and the internal pressure acting on an equal area of flange 78 produces an unbalanced force which substantially neutralizes the valve opening force acting on the disk 80. Since, however, the flange 78 has an effective area greater than that of the valve disk 80, the pressure differential between the supercharger inlet and outlet will produce an unbalanced force acting on the flange 78 in a valve closing direction and thus the valve will be maintained closed with the flange 78 closing the apertures 60 and the disk 80 closing the apertures 64 to prevent recirculation and leakage.

Under the second described condition, that is when the external pressure is above the pressure at the supercharger outlet, the greater pressure on the outside of valve disk 80 will raise the slidably mounted valve disk to a position in which it closes the apertures 64. The position of the pistons 82 and the attached flange 78 and valve stem 72 will depend on the resultant of the various forces tending to move these members, their positions will, however, act only to open or close the passage 60, as the drain valve is already closed.

When the engine ceases operation and the pressures become equalized, the movable portions of the valve mechanism, including the disk 80, will drop by gravity uncovering the apertures 60 and 64 and permitting any liquid collected in the tube 46 or space 52 to drain through the hollow nut 56 to a drainage tube connected therewith. If necessary a spring may be employed to force the valve mechanism open when the engine ceases operation.

Figure 3:
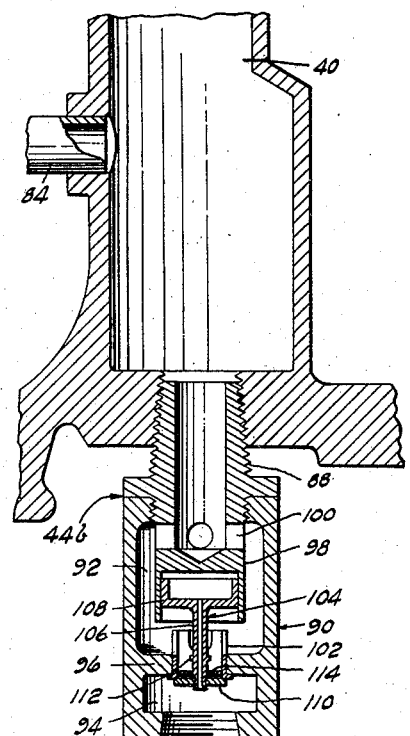
Fig. 3 is a vertical sectional view of a somewhat modified form of liquid drain device.
Figure 4:
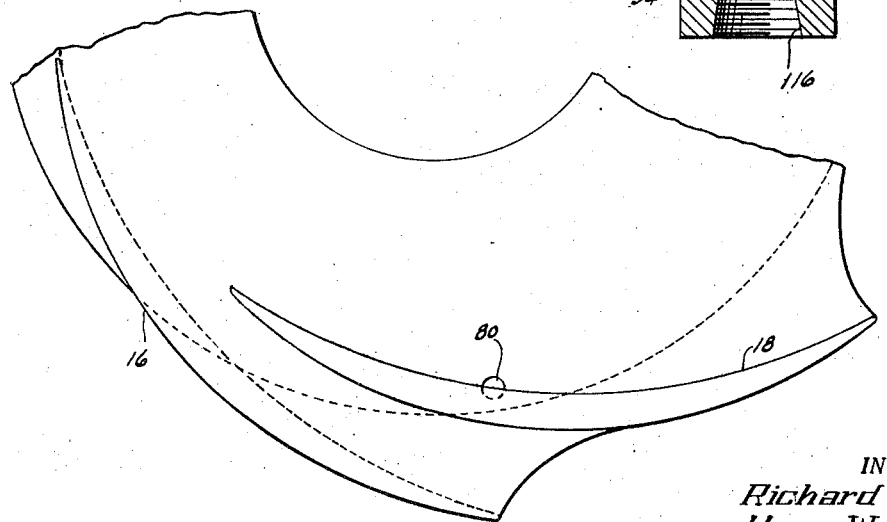
Fig. 4 is an elevational view of a fragmentary portion of the lower part of the induction system illustrated in Fig. 1.

In the form of the invention illustrated in Fig. 3 a hollow flanged nut 88 is screw-threaded into the lower end of the drain passage 40 and carries upon its lower end, below the flange a valve casing, generally indicated at 90. This valve casing includes two chambers 92 and 94 in vertical alignment and separated by an apertured transverse partition 96. The upper chamber includes a cylindrical guide-way 98 which is preferably formed as an integral, downwardly, projecting portion of the nut 88. A transverse passageway 100 connects the hollow interior of the nut 88 with the space in the chamber 92 surrounding the guide-way 98. A castelated bushing 102 is inserted in the aperture in the partition 96 and extends upwardly above the partition. The movable valve element, generally indicated at 104 has a tubular stem 106 which carries upon its upper end a piston 108 which has a sliding fit in the cylindrical guide-way 98, and, upon its lower end, a fixed disk 110 which is effective to close the aperture in the partition 96 when the valve element is in its uppermost position. Above the disk 110 the stem is provided with a shoulder 112 and between this shoulder and the disk 110, there is positioned a second valve disk 114 which is slidable on the stem. The chamber 94 is connected with a screw-threaded aperture 116 which is connected with the upper end of a drain tube, not illustrated.

With this construction it will be apparent that, except when the opening through the bushing 102 is closed either by the disk 114 or by this disk and the disk 110, any liquid which has condensed in the induction system and flowed into the drain channel 40, either through the drain channel or through the connecting conduit 84, if such a conduit is utilized, will flow through the hollow nut 88 into the chamber 92, through the bushing 102 to the chamber 94 and from there into the drain tube. When the engine is operating and the pressure of the fluid in the drain channel 40 is below the pressure of the surrounding atmosphere, the slidable disk 114 will be drawn upwardly by the suction of air through the bushing 102 and will close the bushing against the entrance of air. When the fluid pressure in the drain channel 40 is above the pressure of the surrounding atmosphere, this higher pressure will act on the undersurface of the piston 108 to force the piston upwardly in the guide-way 98 thereby moving the disk 110 upwardly to seal the opening through the bushing 102, at the same time also moving the disk 114 into sealing relation.

When the engine is stopped and the fluid pressure within the drain channel and that of the surrounding atmosphere are equalized, the movable valve element 104 will drop of its own weight carrying therewith disk 114 to open the aperture through the bushing 102 and permit any liquid which has collected in the system to flow out through the drain tube received in the aperture 116.

From the above description it will be observed that there has been provided, in slightly modified mechanical forms, an effective liquid drain valve for an engine induction system which operates to prevent the flow of air or fluid either into or out of the induction system while the engine is operating and which is effective to drain any condensed liquid from the system as soon as the engine has stopped.

While there has been illustrated and described, in slightly modified forms, a mechanical arrangement of what is now considered to be the preferred form of the invention, it is to be understood that the invention is not limited to the constructional forms so illustrated and described but that such changes in the size, shape and arrangement of parts may be resorted to as come within the scope of the subjoined claims.

Having now described the invention so that others skilled in the art may clearly understand the same what it is desired to secure by Letters Patent is as follows:

1. In a fluid induction system, a normally open drain valve, and means automatically maintaining said drain valve closed whenever the pressure of the fluid in said system is above or below the pressure of the surrounding atmosphere.

2. In a fluid induction system, a normally open drain valve, means for maintaining said valve closed whenever the pressure of the fluid in said system is above the pressure of the surrounding atmosphere, and means for maintaining said valve closed whenever the pressure of the fluid in said system is below the pressure of the surrounding atmosphere.

3. In an engine fuel induction system including a supercharger, a normally open drain opening for said system, and means subject to the pressure difference on opposite sides of said supercharger for maintaining said opening closed whenever said engine is operating.

4. In an engine intake, a drain opening, a valve for opening and closing said drain opening, and an expansible chamber device connected with said valve and responsive to the fluid pressure in said intake to maintain said valve closed whenever said fluid pressure is above that of the surrounding atmosphere.

5. In a fluid induction system provided with a drain opening providing a free passage from the interior to the exterior of said system whenever the fluid pressure in said system is the same as the pressure of the surrounding atmosphere, a closure member operative to close said opening whenever the fluid pressure in said system is below the fluid pressure at the vent of said opening, and means actuating said closure member to close said opening whenever the fluid pressure in said system is above the fluid pressure at the vent of said drain opening.

6. In an engine induction system provided with a drain channel for removing liquid condensate from said system, means responsive to differences between the fluid pressure within said system and the pressure of the surrounding atmosphere to control the opening and closing of said drain channel, said means comprising, a closure member and a seat therefor operative to close said channel when the fluid pressure in said system is below the pressure of the surrounding atmosphere, and an expansible chamber device connected with said closure member to close said channel when the fluid pressure in said system is above the pressure of the surrounding atmosphere.

7. In an engine induction system having a drain channel providing at times an open passage from the interior to the exterior of said system for removing liquid condensate therefrom, means responsive to differences between the fluid pressure within said system and the pressure of the surrounding atmosphere to control the opening and closing of said drain channel, said means comprising, a closure member, and a piston and cylinder device within said channel, said piston having an area greater than the area of said closure member and being operatively connected therewith.

8. In an engine induction system provided with a drain channel for removing liquid condensate from said system, means responsive to differences in the fluid pressure in different parts of said system and the pressure of the surrounding atmosphere to control the opening and closing of said drain channel, said means comprising, a closure member, a piston and cylinder device in said channel, a stem connecting said piston and said closure member, and a second closure member loosely mounted on said stem between said first mentioned closure member and said piston.

9. In an engine intake provided with a drain opening, a valve comprising a disk member operative to close said drain opening when the pressure of the fluid in said intake is below the pressure of the surrounding atmosphere, and a piston and cylinder device for operating a closure member to close said drain opening when the fluid pressure in said intake is above the pressure of the surrounding atmosphere.

10. In a drain valve for a chamber, a valve closure element constructed and arranged to be moved by a continuously acting force to valve opening position and by atmospheric pressure outside of said chamber greater than the pressure within said chamber to valve closing position, and means actuated by a pressure in said chamber higher than the pressure of the atmosphere outside of said chamber for moving said element to valve closing position.

11. In a conduit system provided with a drain opening, a valve comprising a movable member actuated by atmospheric pressure to close said drain when the pressure of the fluid in said conduit is below the pressure of the surrounding atmosphere, and actuated by gravity to open said drain when the pressure of the fluid in said conduit is substantially equal to the pressure of the surrounding atmosphere and a pressure operative device for actuating said member to close said drain when the pressure of the fluid in said conduit is above the pressure of the surrounding atmosphere.

12. In an engine fuel induction system including two chambers, a drain opening connected with both chambers and providing a free passage from said chambers to the exterior of said system whenever the pressure in all parts of said system is substantially the same as the pressure of the surrounding atmosphere, and a valve mechanism responsive to a difference in the pressure of the fluid in said two chambers for maintaining said drain opening closed whenever such pressure difference exists.

RICHARD S. BUCK.
HARRY W. GUNBERG.